United States Patent
Kakigami et al.

(10) Patent No.: US 10,159,936 B2
(45) Date of Patent: Dec. 25, 2018

(54) REVERSE OSMOSIS MEMBRANE FILTERING DEVICE

(71) Applicant: MITSUBISHI HEAVY INDUSTRIES, LTD., Tokyo (JP)

(72) Inventors: Hidemasa Kakigami, Tokyo (JP); Yoshiaki Ito, Tokyo (JP); Masayuki Tabata, Tokyo (JP); Katsunori Matsui, Tokyo (JP); Kiichi Tokunaga, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 207 days.

(21) Appl. No.: 15/102,721

(22) PCT Filed: Jul. 29, 2014

(86) PCT No.: PCT/JP2014/069893
§ 371 (c)(1),
(2) Date: Jun. 8, 2016

(87) PCT Pub. No.: WO2015/093088
PCT Pub. Date: Jun. 25, 2015

(65) Prior Publication Data
US 2016/0354725 A1    Dec. 8, 2016

(30) Foreign Application Priority Data

Dec. 20, 2013 (JP) ................................. 2013-264134

(51) Int. Cl.
*B01D 61/08* (2006.01)
*B01D 61/12* (2006.01)
(Continued)

(52) U.S. Cl.
CPC ........... *B01D 61/08* (2013.01); *B01D 61/025* (2013.01); *B01D 61/12* (2013.01); *B01D 61/22* (2013.01);
(Continued)

(58) Field of Classification Search
CPC .............. B01D 61/12; B01D 2313/105; B01D 2201/0469; B01D 2201/0429
See application file for complete search history.

(56) References Cited

U.S. PATENT DOCUMENTS

| 4,792,401 A | 12/1988 | Truex et al. |
| 2012/0067808 A1 | 3/2012 | Tayalia et al. |
| 2013/0146514 A1* | 6/2013 | Reeves ................ B01D 61/022 210/106 |

FOREIGN PATENT DOCUMENTS

| EP | 2 008 705 A1 | 12/2008 |
| JP | 08-108048 A | 4/1996 |

(Continued)

OTHER PUBLICATIONS

Office Action dated Jul. 15, 2016, issued in counterpart Japanese Patent Application No. 2013-264134. (5 pages).

(Continued)

*Primary Examiner* — Krishnan S Menon
*Assistant Examiner* — Ryan B Huang
(74) *Attorney, Agent, or Firm* — Westerman, Hattori, Daniels & Adrian, LLP (57) ABSTRACT

A reverse osmosis membrane filtering device includes: a water-collecting member including at least one water collecting pipe, and having a plurality of sections each of which has a plurality of water collecting apertures; at least one filter assembly disposed around the plurality of sections, the at least one filter assembly including a filter member including a reverse osmosis membrane; at least one insertion tube
(Continued)

disposed inside the water-collecting member and defining a plurality of permeate-water channels corresponding to the plurality of sections inside the water-collecting member in cooperation with at least one seal member; and a pressure adjusting device configured to increase a pressure of at least one of the plurality of permeate-water channels to a pressure higher than that of another one of the plurality of permeate-water channels.

7 Claims, 11 Drawing Sheets

(51) Int. Cl.
*B01D 63/10* (2006.01)
*C02F 1/44* (2006.01)
*B01D 61/02* (2006.01)
*B01D 61/22* (2006.01)
*B01D 63/12* (2006.01)
*C02F 103/08* (2006.01)

(52) U.S. Cl.
CPC .............. *B01D 63/10* (2013.01); *B01D 63/12* (2013.01); *C02F 1/441* (2013.01); *B01D 2311/14* (2013.01); *B01D 2313/04* (2013.01); *B01D 2313/12* (2013.01); *B01D 2317/04* (2013.01); *B01D 2319/022* (2013.01); *C02F 2103/08* (2013.01); *C02F 2201/003* (2013.01)

(56) References Cited

FOREIGN PATENT DOCUMENTS

| JP | 11-207156 | A | | 8/1999 | | |
| JP | 2000-15064 | A | | 1/2000 | | |
| JP | 2000-167358 | A | | 6/2000 | | |
| JP | 2001-137672 | A | | 5/2001 | | |
| JP | 2004-518531 | A | | 6/2004 | | |
| JP | 2009-262133 | A | | 11/2009 | | |
| JP | 2010-042404 | A | | 2/2010 | | |
| JP | 2010-179264 | A | | 8/2010 | | |
| JP | 2012-130839 | A | | 7/2012 | | |
| JP | 2012130839 | A | * | 7/2012 | ............ | B01D 63/12 |
| JP | 2014-159006 | A | | 9/2014 | | |
| JP | 2014-161797 | A | | 9/2014 | | |
| WO | 2010/089912 | A1 | | 8/2010 | | |

OTHER PUBLICATIONS

International Search Report dated Sep. 9, 2014, issued in counterpart International Application No. PCT/JP2014/069893. (10 pages).
Notification of Transmittal of Translation of the International Preliminary Report on Patentability (Form PCT/IB/326) issued in counterpart International Application No. PCT/JP2014/069893 dated Jun. 30, 2016 with Forms PCT/IB/373, PCT/IB/338 and PCT/ISA/237, with English translation. (20 pages).
Decision to grant a patent dated Oct. 14, 2016, issued in counterpart Japanese Application No. 2013-264134, with English translation (6 pages).
Extended (supplementary) European Search Report dated Dec. 7, 2016, issued in counterpart European Application No. 14871253.2. (7 pages).

* cited by examiner

PERMEATE WATER

REVERSE OSMOSIS MEMBRANE FILTERING DEVICE

TECHNICAL FIELD

The present disclosure relates to a reverse osmosis membrane filtering device.

BACKGROUND ART

A reverse osmosis (RO) membrane filtering device is used, for instance, to desalinate seawater or to produce purified water. There is a type of RO membrane filtering device that includes a plurality of spiral RO membrane elements accommodated in a pressure container. A spiral RO membrane element includes a permeate-water channel and an RO membrane disposed around the permeate-water channel. If more than one spiral RO membrane elements are to be disposed in series, permeate-water channels are connected via plugs.

With a large number of RO membrane elements disposed in series, there may be considerable variation in the amount of permeate water between RO membrane elements in the front and RO membranes in the rear.

In view of this, Patent Document 1 discloses a spiral seawater desalinating device with a permeate-water channel closed in the middle with a plug to be divided into a front permeate-water channel and a rear permeate-water channel, and a front permeate-water amount obtained by the front permeate-water channel is adjusted by a pressure adjusting valve. With this configuration, the flow rate of the front permeate water is adjusted, and thereby it is possible to reduce variation in the amount of permeate water among a plurality of RO membrane elements connected in series.

CITATION LIST

Patent Literature

Patent Document 1: JP2-1-179264A

SUMMARY

Problems to be Solved

With a larger number of reverse osmosis membrane elements connected in series, there may be a larger number of front RO membrane elements and rear RO membrane elements, and the amount of permeate water may be different between the front RO membrane elements and the rear RO membrane elements. In other words, if there is a larger number of permeate-water channels (water collecting pipes), or if the length of a permeate-water channel is longer, the amount of permeate water may vary more in the axial direction of the water channels.

An object of at least one embodiment of the present invention is to provide a reverse osmosis membrane filtering device capable of reducing variation in the amount of permeate water in the axial direction of water collecting pipes regardless of the number or the length of the water collecting pipes.

Solution to the Problems

A reverse osmosis membrane filtering device according to some embodiments of the present invention comprises: a container having an inlet of unprocessed water, an outlet of concentrate water, and at least one permeate-water outlet; a water-collecting member including at least one water collecting pipe, and having a plurality of sections each of which extends inside the container and has a plurality of water collecting apertures; at least one filter assembly disposed around the plurality of sections, the at least one filter assembly including a filter member comprising as reverse osmosis membrane, an axial direction channel extending along the at least one water collecting pipe, and a water collecting, channel extending toward the plurality of water collecting apertures; at least one seal member disposed inside the water-collecting member; at least one insertion tube disposed inside the water-collecting member and defining a plurality of permeate-water channels corresponding to the plurality of sections inside the water-collecting member in cooperation with the at least one seal member; and a pressure adjusting device configured to increase a pressure of at least one of the plurality of permeate-water channels to a pressure higher than that of another one of the plurality of permeate-water channels.

With this configuration, the at least one insertion tube is disposed inside the water-collecting member, and thereby the plurality of permeate-water channels are formed corresponding to the plurality of sections, so that the pressure adjusting device can increase a pressure of at least one permeate-water channel to a pressure higher than that of another one of the permeate-water channels. The number of sections of the water-collecting member can be set optionally, and thereby it is possible to set the number of sections in accordance with the number and the length of the water-collecting member. Further, the pressures of the plurality of permeate-water channels are adjusted relatively by the pressure adjusting device, and thereby it is possible to reduce variation in the amount of permeate water in the axial direction of the water-collecting member.

In some embodiments, the pressure adjusting device is configured to increase a pressure of the permeate-water channel corresponding to a more upstream section from among the plurality of permeate-water channels.

In a more upstream section with respect to a flow direction of water being processed, concentration of impurity substances of the water being processed is relatively lower than that in a more downstream section, and thus an osmosis pressure is also relatively low. Therefore, assuming that the pressures applied to the respective sections of the plurality of permeate-water channels are the same, an effective pressure applied to an RO membrane of a more upstream section is higher; and a larger amount of permeate water is collected in the more upstream section. In this regard, with the above configuration, the pressure of the permeate-water channel corresponding to the more upstream section is increased, and thereby it is possible to equalize effective pressures that act on the RO membranes in the plurality of sections, which makes it possible to reduce variation in the amount of permeate water.

In some embodiments at least one permeate-water outlet comprises a first permeate-water outlet disposed on one end of the container and a second permeate-water outlet disposed on the opposite end of the container. The plurality of sections comprises a first section, a second section, a third section, and a fourth section disposed in this order from the first permeate-water outlet toward the second permeate-water outlet. The at least one insertion tube comprises a first insertion tube extending inside the first section and a second insertion tube extending inside the fourth section. The plurality of permeate-water channels comprises a first permeate-water channel, a second permeate-water channel, a third permeate-water channel, and a fourth permeate-water channel which respectively correspond to the first section, the second section, the third section, and the fourth section.

With this configuration, even with the water-collecting member having the first to fourth sections, it is possible to form the first to fourth permeate-water channels inside the water-collecting member by providing the first and second insertion tubes inside the first and fourth sections.

In some embodiments, the reverse osmosis membrane filtering device further comprises: a sensor capable of outputting a measurement signal related to a pressure of at least one of the plurality of permeate-water channels; and a controller configured to control the pressure adjusting device on the basis of an output of the sensor.

With this configuration, even if aging such as clogging of the filter member occurs, it is possible to maintain an appropriate pressure for each permeate-water channel, and to reduce variation in the amount of permeate water collected in respective sections.

In some embodiments, the pressure adjusting device includes at least one orifice.

With this configuration, the pressure adjusting device can increase a pressure of at least one permeate-water channel to a pressure higher than that of another one of the permeate-water channels, through a simple configuration.

In some embodiments, the reverse osmosis membrane filtering device further comprises a guide member disposed inside the water-collecting member and configured to guide insertion and removal of the at least one insertion tube.

With this configuration, provision of the guide member makes it possible to insert at least one insertion tube inside the water-collecting member. Thus, it is possible to obtain the reverse osmosis membrane filtering device according to an embodiment of the present invention by inserting the guide member and the insertion tube afterwards into a water collecting pipe of an existing reverse osmosis membrane filtering device.

In some embodiments, the filter member of the filter assembly is wound around the at least one water collecting pipe in a spiral shape.

With this configuration, it is possible to employ a spiral reverse osmosis element which has broad utility and high filtering performance.

Advantageous Effects

According to some embodiments of the present invention, provided is a reverse osmosis membrane filtering device capable of reducing variation in the amount of permeate water in the axial direction of water collecting pipes regardless of the number or length of the water collecting pipes.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
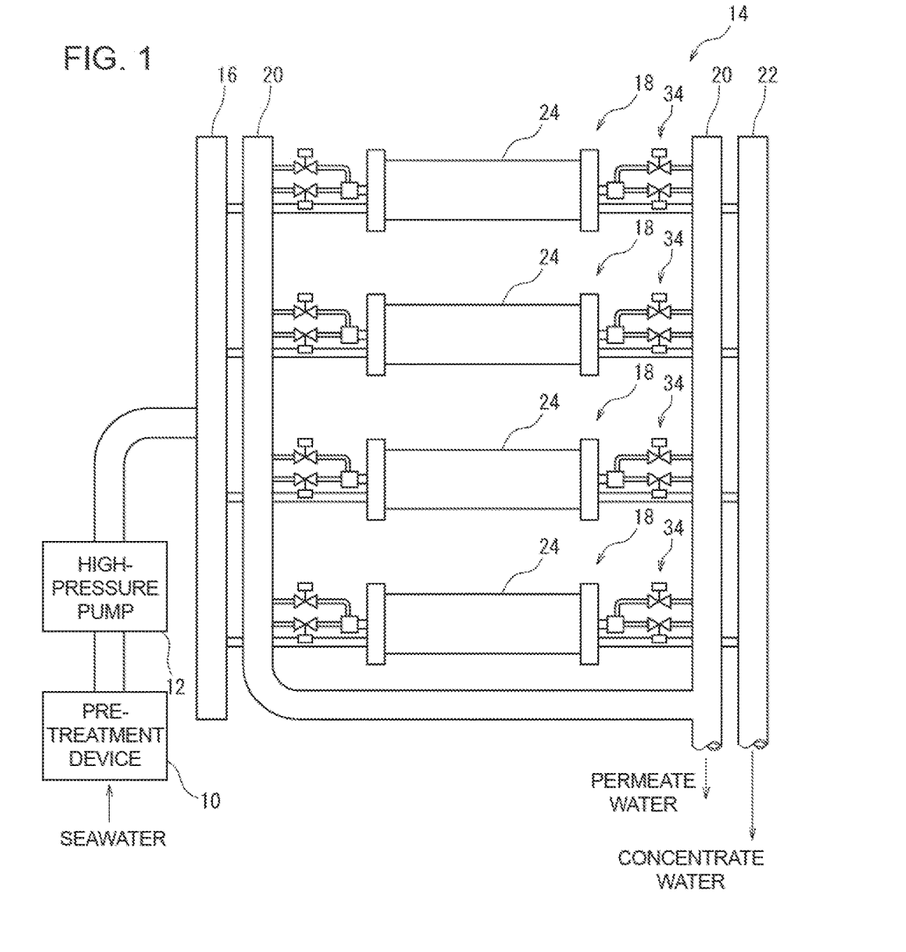
FIG. 1 is a schematic configuration diagram of a seawater desalinating system according to some embodiments of the present invention.

FIG. 1 is a schematic configuration diagram of a seawater desalinating system according to some embodiments of the present invention. The seater desalinating system includes a pretreatment device 10, a high-pressure pump 12, and a reverse osmosis (RO) membrane filtering unit 14.

The pretreatment device 10 includes a sand filtering device, for instance, and is capable of removing suspended solids or the like in seawater. The high-pressure pump 12 feeds water processed by the pretreatment device 10 to the RO membrane filtering unit 14.

The RO membrane filtering unit 14 includes an unprocessed-water header tube 16, a plurality of RO membrane filtering devices 18, a plurality of permeate-water header tubes 20, and a concentrate-water header tube 22.

Via the unprocessed-water header tube 16, high-pressure unprocessed water supplied from the high-pressure pump 12 is distributed to each of the RO membrane filtering devices 18. The permeate water (filtered water) obtained by filtering the unprocessed water with each RO membrane filtering device 18 is collected by the permeate-water header tube 20, and then fed to a storage tank for permeate water, for instance. Concentrate water remaining after filtration of unprocessed water by the RO membrane filtering devices 18 is collected by the concentrate-water header tube 22, and then fed to a storage tank for concentrate water, for instance.

Figure 2:
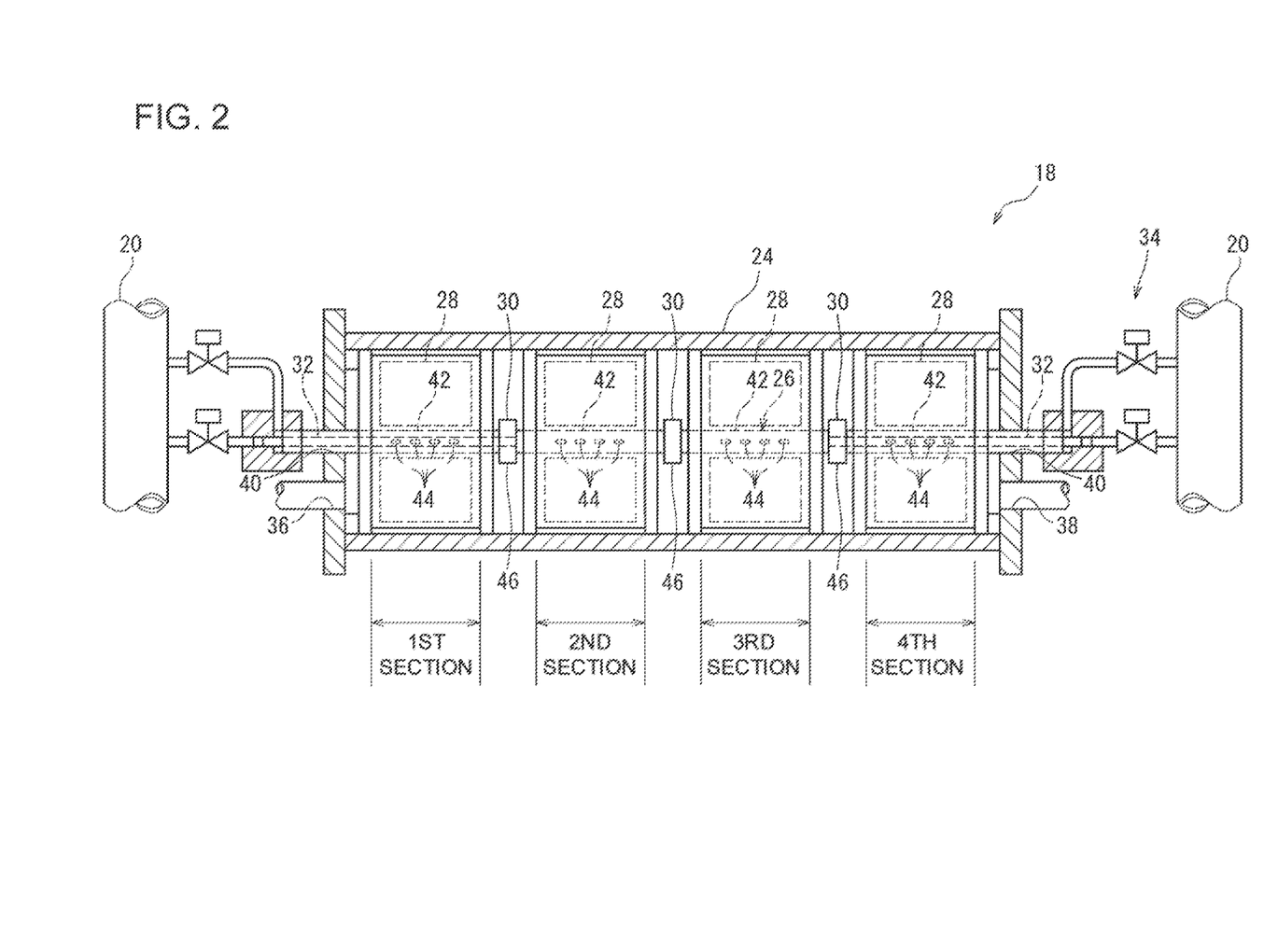
FIG. 2 is a schematic configuration diagram of a reverse osmosis membrane filtering device in FIG. 1.

FIG. 2 is a schematic configuration diagram of the RO membrane filtering device 18. As depicted in FIG. 2, the RO membrane filtering device 18 includes a pressure container 24, a water-collecting member 26, at least one filter assembly 28, at least one seal member 30, at least one insertion tube 32, and a pressure adjusting device 34.

The pressure container 24 includes an inlet 36 of unprocessed water, an outlet 38, and at least one permeate-water outlet 40. For instance, the pressure container 24 has a cylindrical shape, and is provided with the inlet 36 on one end and the outlet 38 on the other end. The inlet 36 is connected to the unprocessed-water header tube 16 via a branched tube, and the outlet 38 is connected to the concentrate-water header tube 20 via another branched tube.

In the present embodiment, the pressure container 24 has two permeate-water outlets 40. One of the permeate-water outlets 40 is disposed on one end of the pressure container 24, while the other one of the permeate-water outlets 40 is disposed on the other end of the pressure container 24. More specifically, the two permeate-water outlets 40 are disposed on respective end walls of the pressure container 24, and arranged on the axis of the pressure container 24.

The water-collecting member 26 includes at least one water collecting pipe 42. The water-collecting member 26 has a plurality of sections extending inside the pressure container 24, and each of the plurality of sections has a plurality of water collecting apertures 44. In the present embodiment, the water-collecting member 26 has four water collecting pipes 42, and connectors 46 for connecting the four water collecting pipes in series. Further, in accordance with the four water collecting pipes 42, the water-collecting member 26 has four sections: the first section, the second section, the third section, and the fourth section.

At least one filter assembly 28 is disposed around the plurality of sections of the water-collecting member 26. In the present embodiment, four filter assemblies 28 are disposed around the four sections, one filter assembly for each section.

Figure 3:
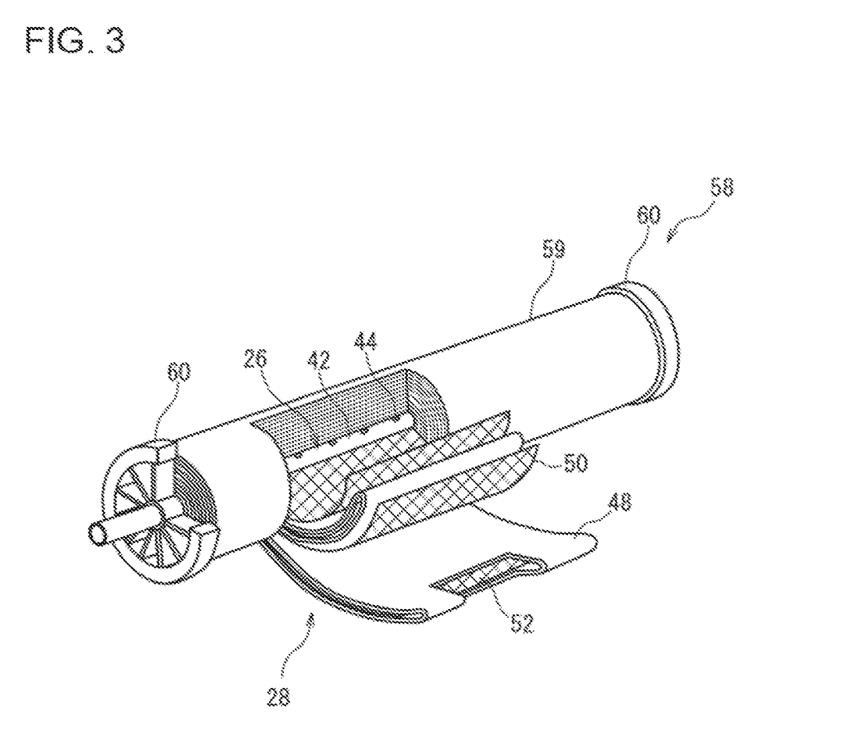
FIG. 3 is a diagram for describing a configuration of a filter assembly in FIG. 2.

FIG. 3 is a diagram for describing a configuration of the filter assembly 28. The filter assembly 28 includes a filter member 48 comprising an RO membrane. Further, the filter assembly 28 includes an axial-direction channel extending along the water collecting pipe 42, and a water collecting channel extending toward the water collecting apertures 44.

In the present embodiment, the filter member 48 has a bag shape and is wound around the water collecting pipe 42 in a spiral shape. Openings communicating with the water collecting apertures 44 are disposed on a radially inner part of the filter member 48 that contacts the water collecting pipe 42. Further the filter assembly 28 includes the first spacer 50 and the second spacer 52 both having a sheet shape and rolled up in a spiral shape along with the filter member 48.

Figure 4:
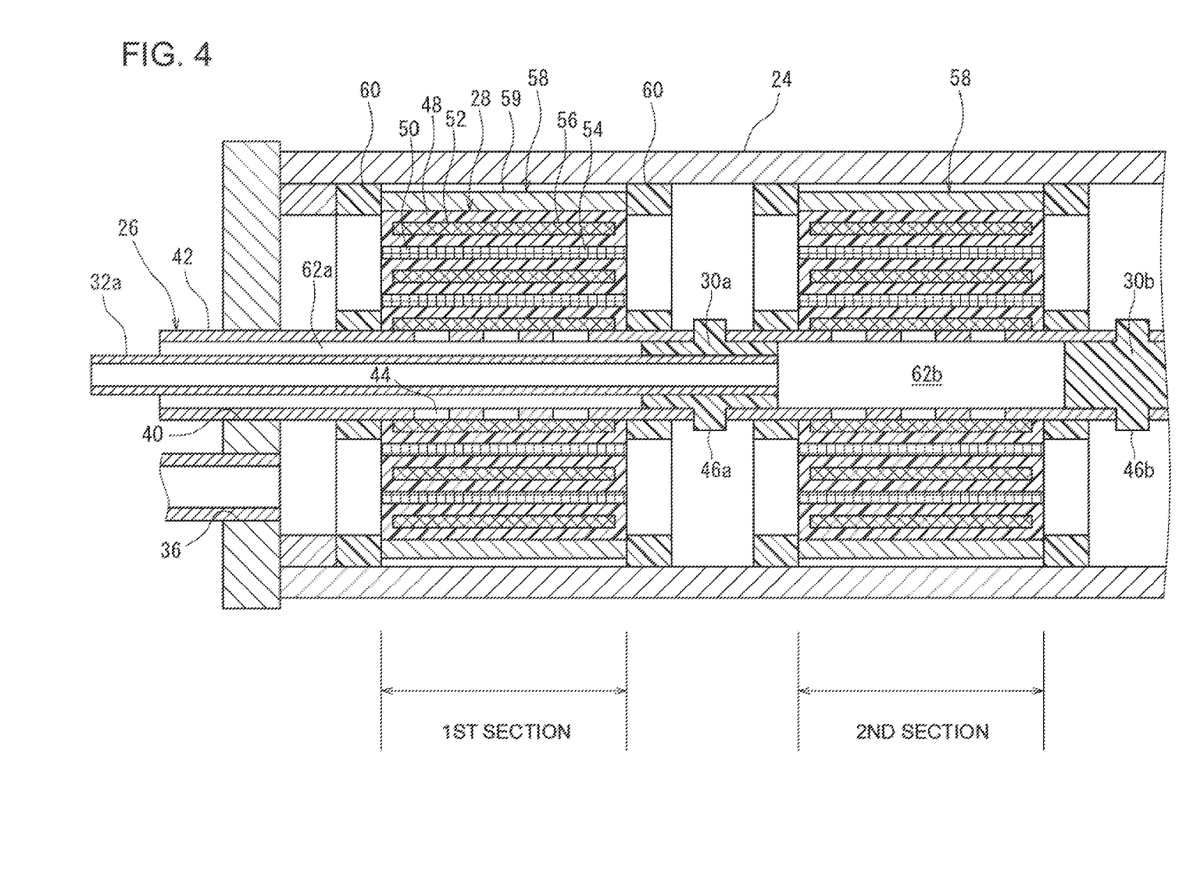
FIG. 4 is a diagram for describing a configuration of a seal member and an insertion tube in FIG. 2, schematically showing a partial cross sectional view of the reverse osmosis membrane filtering device.

The first spacer 50 is interposed between outer surfaces of the filter member 48, thereby defining an axial direction channel 54 outside the filter member 48 (see FIG. 4). The second spacer 52 is disposed inside the filter member 48, thereby defining a spiral channel that serves as a water collecting channel 56, inside the filter member 48 (see FIG. 4).

In the present embodiment the single water collecting pipe 42 and the single filter assembly 28 disposed around the water collecting pipe 42 constitute one RO membrane element 58. Further, four RO membrane elements 58 are accommodated in the pressure container 24 in a state of being connected in series by connectors 46. The RO membrane element 58 includes a case 59 of a tubular shape surrounding the filter assembly 28, and retention members 60 attached to the opposite ends of the case 59. The retention members 60 have an opening to permit a flow of unprocessed water in the axial direction of the water collecting pipe 42.

Figure 5:
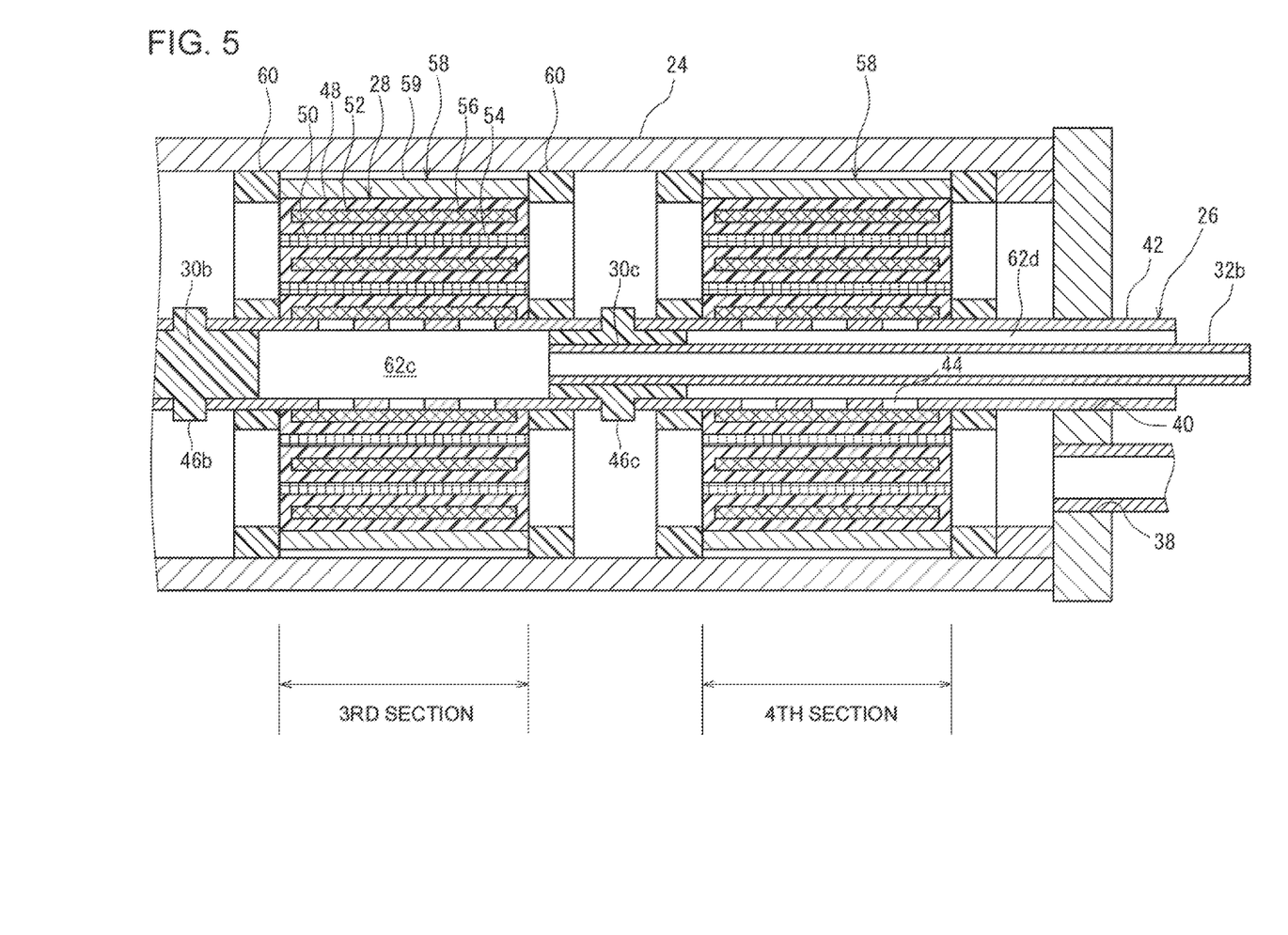
FIG. 5 is a diagram for describing a configuration of a seal member and an insertion tube in FIG. 2, schematically showing a partial cross sectional view of the reverse osmosis membrane filtering device.

FIGS. 4 and 5 are diagrams for describing a configuration of a seal member 30 and an insertion tube 32, schematically showing a partial cross sectional view of the RO membrane filtering device 18.

As depicted in FIG. 4, in the present embodiment, the first insertion tube 32a is inserted into the first section of the water-collecting member 26. The water collecting pipe 42 constituting the first section extends to outside of the pressure container 24 through the permeate-water outlet 40, so that an outer end of the water collecting pipe 42 is disposed outside the pressure container 24. An end of the first insertion tube 32a protrudes beyond the outer end of the water collecting pipe 42, while the other end extends to the second section through the inside of the first section.

A connector 46a of a cylindrical shape is disposed on the boundary between the first section and the second section, and is inserted into end portions of two adjacent water collecting pipes 42. The first insertion tube 32a is inserted into the connector 46a, and the connector 46a seals a gap between the first insertion tube 32a and the water collecting pipe 42. In other words, the connector 46a constitutes a seal member 30a.

Further, a connector 46b of a column shape is disposed on the boundary between the second section and the third section, and is inserted into end portions of two adjacent water collecting pipes 42. Thus, the connector 46b seals a gap between the inside of the second section and the inside of the third section. In other words, the connector 46b constitutes a seal member 30b.

Similarly, as depicted in FIG. 5, in the present embodiment, the second insertion tube 32b is inserted into the fourth section of the water-collecting member 26. The water collecting pipe 42 constituting the fourth section extends to outside of the pressure container 24 through the permeate-water outlet 40, so that an outer end of the water collecting pipe 42 is disposed outside the pressure container 24. An end of the second insertion tube 32b protrudes beyond the outer end of the water collecting pipe 42, while the other end extends to the third section through the inside of the fourth section.

A connector 46c of a cylindrical shape is disposed on the boundary between the third section and the fourth section, and is inserted into end portions of two adjacent water collecting pipes 42. The second insertion tube 32b is inserted into the connector 46c, and the connector 46c seals a gap between the second insertion tube 32b and the water collecting pipe 42. In other words, the connector 46c constitutes a seal member 30c.

The first insertion tube 32a, the second insertion tube 32b, and the seal members 30a, 30b, 30c cooperate with one another to define a plurality of permeate-water channels 62 inside the water collecting pipe 42: specifically, the first permeate-water channel 62a, the second permeate-water channel 62b, the third permeate-water channel 62c, and the fourth permeate-water channel 62d. The first permeate-water channel 62a is disposed corresponding to the first section, and configured to guide permeate water collected in the first section to outside of the pressure container 24. Similarly, the second to fourth permeate-water channels 62b, 62c, 62d are disposed respectively corresponding to the second to fourth sections, and configured to guide permeate water collected in the second to fourth sections to outside of the pressure container 24, respectively.

The pressure adjusting device 34 is configured to be capable of increasing a pressure of at least one permeate-water channel 62 of the plurality of permeate-water channels 62 to a pressure higher than that of another one of the permeate-water channels 62. Specifically, the pressure adjusting device 34 is configured to be capable of increasing a pressure of the permeate-water channel 62 corresponding to a more upstream section.

In the present embodiment, the pressure adjusting device 34 includes a plurality of control valves 64 disposed outside the pressure container 24. Specifically, it includes the first control valve 64a connected to the first permeate-water channel 62a, the second control valve 64b connected to the second permeate-water channel 62b, the third control valve 64c connected to the third permeate-water channel 62c, and the fourth control valve 64d connected to the fourth permeate-water channel 62d. It possible to increase a pressure of at least one permeate-water channel 62 of the plurality of permeate-water channels 62 to a pressure higher than that of another one of the permeate-water channels 62, by adjusting the opening degrees of the plurality of control valves 64.

In the present embodiment, the opening degrees of the control valves 64 are adjusted so as to satisfy the following relationship:

pressure of the first permeate-water channel 62a>pressure of the second permeate-water channel 62b>pressure of the third permeate-water channel 62c>pressure of the fourth permeate-water channel 62d.

In the above configuration, the number of sections of the water-collecting member 26 can be set optionally, and thereby it is possible to set the number of sections in accordance with the number and the length of the water-collecting member 26. Further, the pressures of the plurality of permeate-water channels 62 are adjusted relatively by the pressure adjusting device 34, and thereby it is possible to reduce variation in the amount of permeate water in the axial direction of the water-collecting member 26.

Accordingly, the amount of permeate water and the purified-water recovery rate are more equalized between the RO membrane elements 58, and thus it is possible to increase the amount of permeate water and the purified-water recovery rate for the RO membrane filtering device 18 as a whole, as well as to increase the amount of permeate water and the purified-water recovery rate for the RO membrane filtering unit 14 as a whole. Further, equalizing the amount of permeate water and the purified-water recovery rate makes it possible to extend the lifetime of the RO membrane element 58 disposed upstream, and thereby it is to possible to make maintenance works of the RO membrane filtering device 18 easier.

Meanwhile, equalizing the amount of permeate water and the purified-water recovery rate also makes it possible to reduce the number of the RO membrane elements 58 used in the RO membrane filtering device 18 and the RO membrane filtering unit 14 while maintaining the levels of the amount of permeate water and the purified-water recovery rate.

Further, in the above configuration, the pressure adjusting device 34 is configured to be capable of increasing a pressure of the permeate-water channel 62 corresponding to a more upstream section, from among the plurality of permeate-water channels 62.

In a more upstream section with respect to a flow direction of water being processed, concentration of impurity substances of the water being processed is relatively lower than that in a more downstream section, and thus an osmosis pressure is also relatively low. Therefore, assuming that the pressures applied to the respective sections of the plurality of permeate-water channels 62 are the same, an effective pressure applied to an RO membrane in a more upstream section is higher and, a larger amount of permeate water is collected in the more upstream section. In this regard, with the above configuration, the pressure of the permeate-water channel 62 corresponding to a more upstream section is increased, and thereby it is possible to equalize effective pressures that act on the RO membranes between the plurality of sections, which makes it possible to reduce variation in the amount of permeate water.

Moreover, with the above described configuration, even with the water-collecting member 26 having the first to fourth sections, it is possible to form the first to fourth permeate-water channels 62a, 62b, 62c, 62d by providing the first and second insertion tubes 32a, 32b inside the first and fourth sections. Further, the opening degrees of the control valves 64 are adjusted so as to satisfy the following relationship:

pressure of the first permeate-water channel 62a>pressure of the second permeate-water channel 62b>pressure of the third permeate-water channel 62c>pressure of the fourth permeate-water channel 62d.

Accordingly it is possible to reduce variation in the amount of permeate water collected in the four sections.

Figure 6:
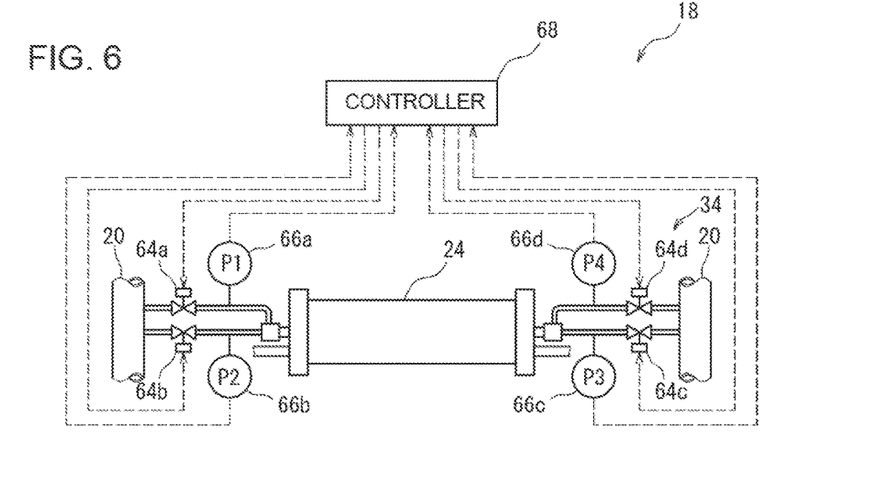
FIG. 6 is a schematic configuration diagram of a reverse osmosis membrane filtering device according to some embodiments.

FIG. 6 is a schematic configuration diagram of the RO membrane filtering device 18 according to some embodiments.

As depicted in FIG. 6, in some embodiments, the RO membrane filtering device 18 further includes the first to fourth sensors 66a, 66b, 66c, 66d (hereinafter, collectively referred to as the sensor 66) and a controller 68.

The first to fourth sensors 66a, 66h, 66c, 66d are configured to output measurement signals, e.g. voltages, that correspond to pressures of the first to fourth permeate-water channels 62a, 62b, 62c, 62d.

The controller 68 comprises a computer, for instance, and is configured to control the pressure adjusting device 34 on the basis of an output of the sensor 66. For instance, the controller 68 is configured to be capable of increasing a pressure of the permeate-water channel 62 corresponding to a more upstream section, from among the plurality of permeate-water channels 62. In other words, the controller 68 adjusts the opening degree of each control valve 64 so as to satisfy the following relationship:

pressure of the first permeate-water channel 62a>pressure of the second permeate-water channel 62b>pressure of the third permeate-water channel 62c>pressure of the fourth permeate-water channel 62d.

With this configuration, even if aging such as clogging of the filter member 48 occurs, it is possible to maintain an appropriate pressure for each permeate-water channel 62, and to reduce variation in the amount of permeate water collected in respective sections.

Figure 7:
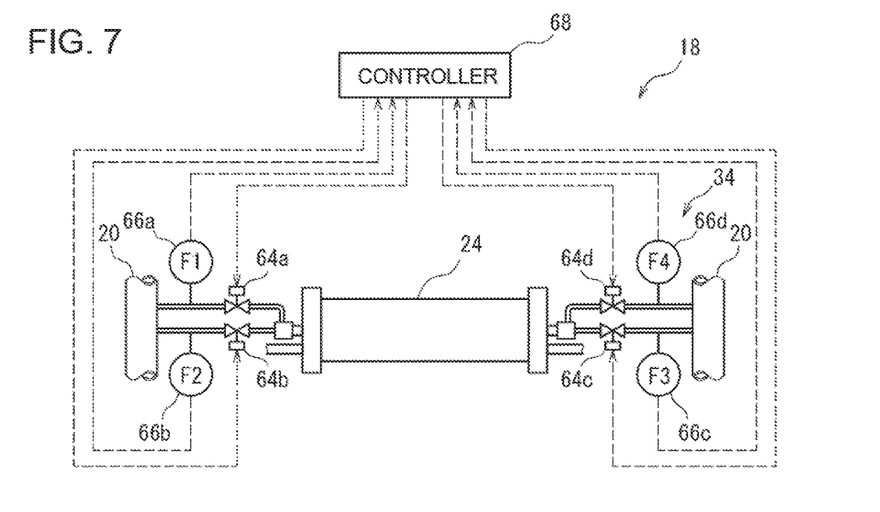
FIG. 7 is a schematic configuration diagram of a reverse osmosis membrane filtering device according to some embodiments.

FIG. 7 is a schematic configuration diagram of the RO membrane filtering device 18 according to some embodiments.

In the RO membrane filtering device 18 in FIG. 7, the sensor 66 comprises a flow rate sensor. The controller 68 adjusts the opening degree of each control valve 64 so as to satisfy the following relationship:

permeate-water flow rate of the first permeate-water channel 62a=a permeate-water flow rate of the second permeate-water channel 62b=permeate-water flow rate of the third permeate-water channel 62c=permeate-water flow rate of the fourth permeate-water channel 62d.

With this configuration, even if aging such as clogging of the filter member 48 occurs, it is possible to maintain an equalized flow rate for each permeate-water channel 62, and to reduce variation in the amount of permeate water collected in respective sections.

Figure 8:
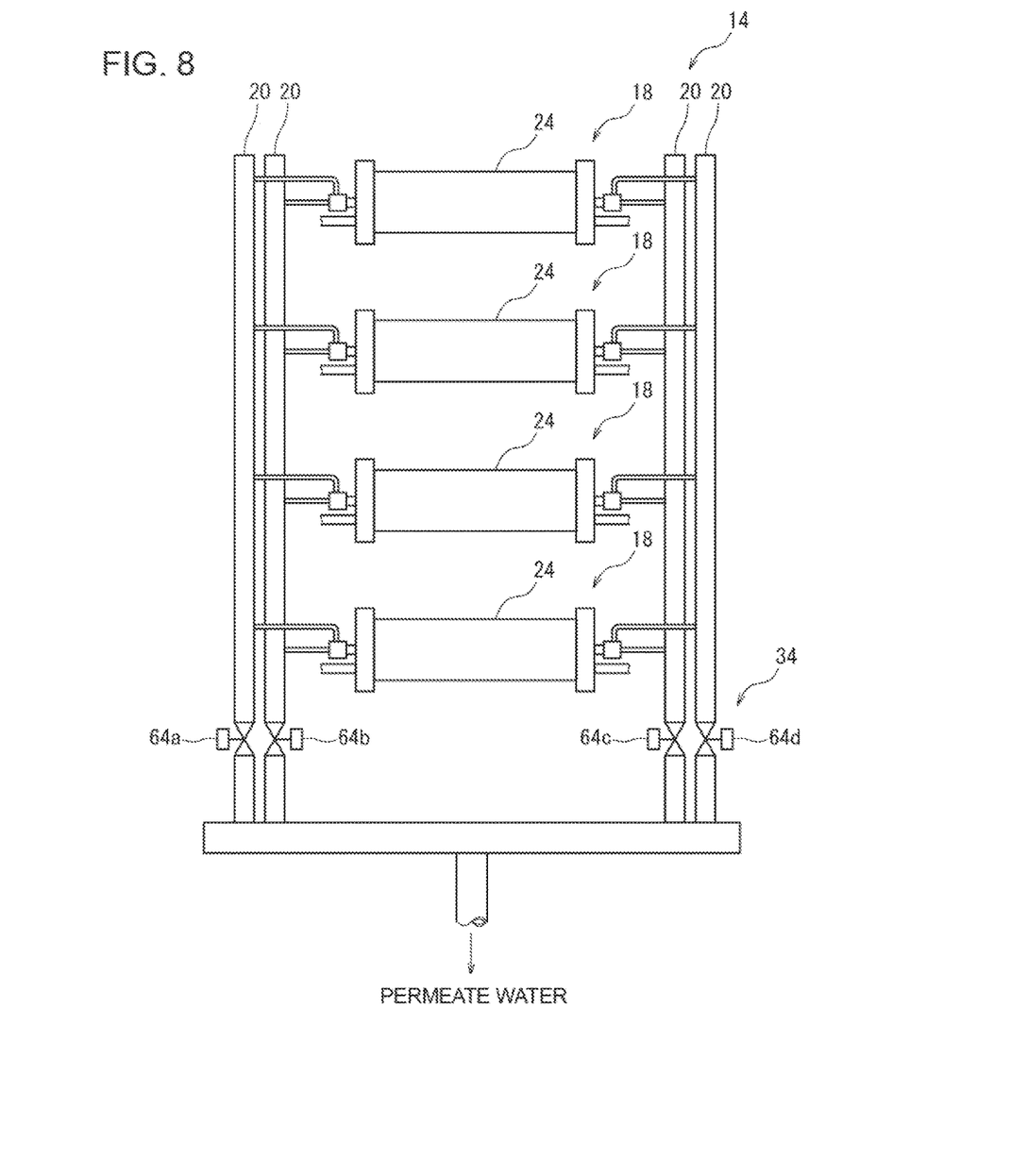
FIG. 8 is a schematic configuration diagram of a reverse osmosis membrane filtering unit according to some embodiments.

FIG. 8 is a schematic configuration diagram of the RO membrane filtering unit 14 according to some embodiments.

The RO membrane filtering unit 14 in FIG. 8 includes a plurality of permeate-water header tubes 20 corresponding to the plurality of permeate-water channels 62. Further, the plurality of control valves 64 constituting the pressure adjusting device 34 is disposed on the header tubes 20.

With this configuration, for the plurality of RO membrane filtering devices 18 connected in parallel, it is possible to reduce the number of control valves 64 constituting the pressure adjusting device 34.

Figure 9:
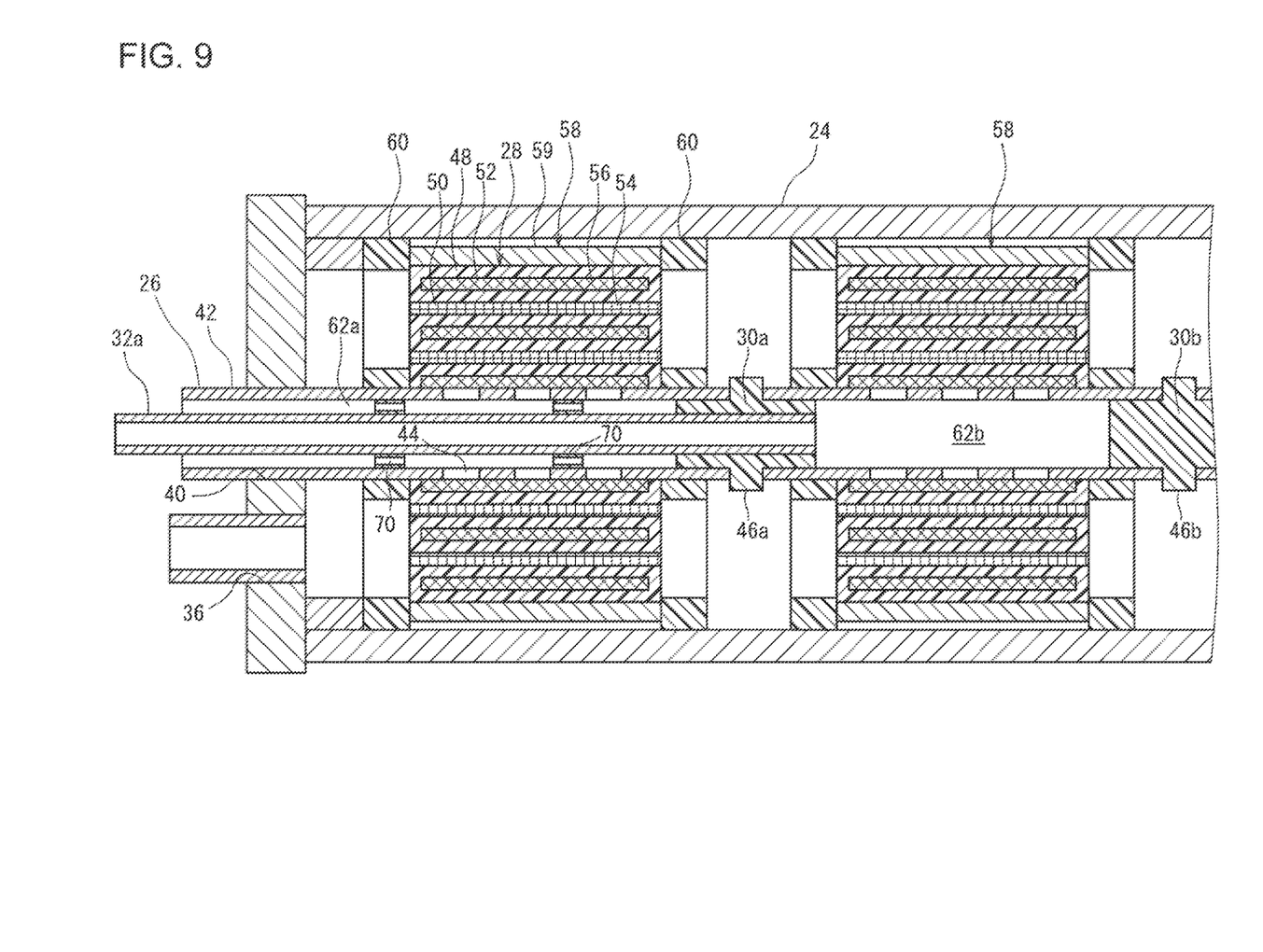
FIG. 9 is a partial schematic cross sectional view of a reverse osmosis membrane filtering device according to some embodiments.

FIG. 9 is a partial schematic cross sectional view of the RO membrane filtering device 18 according to some embodiments.

As depicted in FIG. 9, in some embodiments, the RO membrane filtering device 18 further includes a guide member 70. The guide member 70 is disposed inside the water-collecting member 26 and configured to guide insertion and removal of at least one insertion tube 32 into and from the water-collecting member 26.

Figure 10:
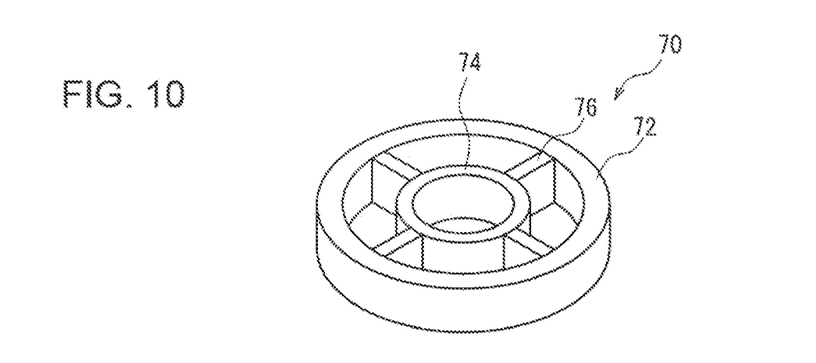
FIG. 10 is a schematic perspective view of an example of a guide member to be applied to a reverse osmosis membrane filtering device according to some embodiments.

FIG. 10 is a schematic perspective view of an example of the guide member 70. The guide member 70 includes an outer ring portion 7 to be in contact with an inner circumferential surface of the water collecting pipe 42, an inner ring portion 74 to be in contact with an outer circumferential surface of the insertion tube 32, and a rim portion 76 for coupling the outer ring portion 72 and the inner ring portion 74. The guide member 70 is fixed to one of the water collecting pipe 42 or the insertion tube 32, and is capable of sliding relative to the other one of the water collecting pipe 42 or the insertion tube 32. The rim portion 76 is disposed in a radial fashion, so that the guide member 70 permits a flow of permeate water.

With this configuration, provision of the guide member 70 makes it possible to insert at least one insertion tithe 32 inside the water-collecting member 26. Thus, it is possible to obtain the RO membrane filtering device 18 according to an embodiment of the present invention by inserting the guide member 70 and the insertion tube 32 afterwards into a water collecting pipe of an existing RO membrane filtering device.

Figure 11:
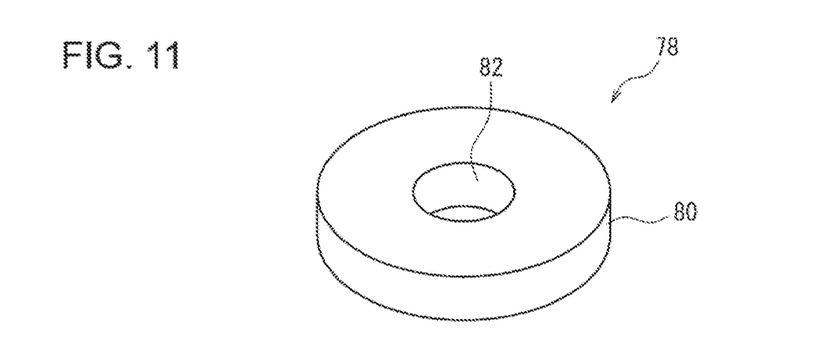
FIG. 11 is a schematic perspective view of an example of a seal member to be applied to a reverse osmosis membrane filtering device according to some embodiments.

FIG. 11 is a schematic perspective view of an example of a seal member to be applied to the RO membrane filtering device 18 according to some embodiments. The seal member 78 in FIG. 11 has a ring shape, and includes an outer circumferential portion 80 to be in contact with an inner circumferential surface of the water collecting pipe 42 and an inner circumferential portion 82 to be in contact with an outer circumferential surface of the insertion tube 32.

The seal member 78 is provided as a separate member from the connectors 46, and can be disposed on an optional position of the water-collecting member 26.

Figure 12:
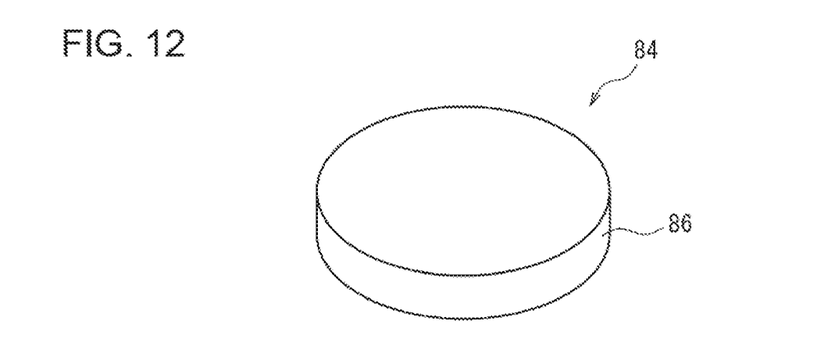
FIG. 12 is a schematic perspective view of an example of a seal member to be applied to a reverse osmosis membrane filtering device according to some embodiments.

FIG. 12 is a schematic perspective view of an example of a seal member to be applied to the RO membrane filtering device 18 according to some embodiments. The seal member 84 in FIG. 12 has a disc shape, and includes an outer circumferential portion 86 to be in contact with an outer circumferential surface of the water collecting pipe 42.

The seal member $4 is provided as a separate member from the connectors 46, and can be disposed on an optional position of the water-collecting member 26.

Figure 13:
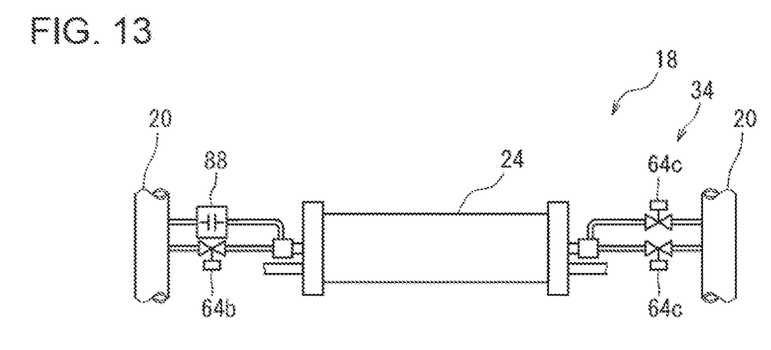
FIG. 13 is a schematic configuration diagram of a reverse osmosis membrane filtering device according to some embodiments.

FIG. 13 is a schematic configuration diagram of the RO membrane filtering device 18 according to some embodiments.

As depicted in FIG. 13, the pressure adjusting device 34 has at least one orifice 88.

With this configuration, the pressure adjusting device 34 can increase a pressure of at least one permeate-water channel 62 to a pressure higher than that of another one of the permeate-water channels 62, through a simple configuration.

Figure 14:
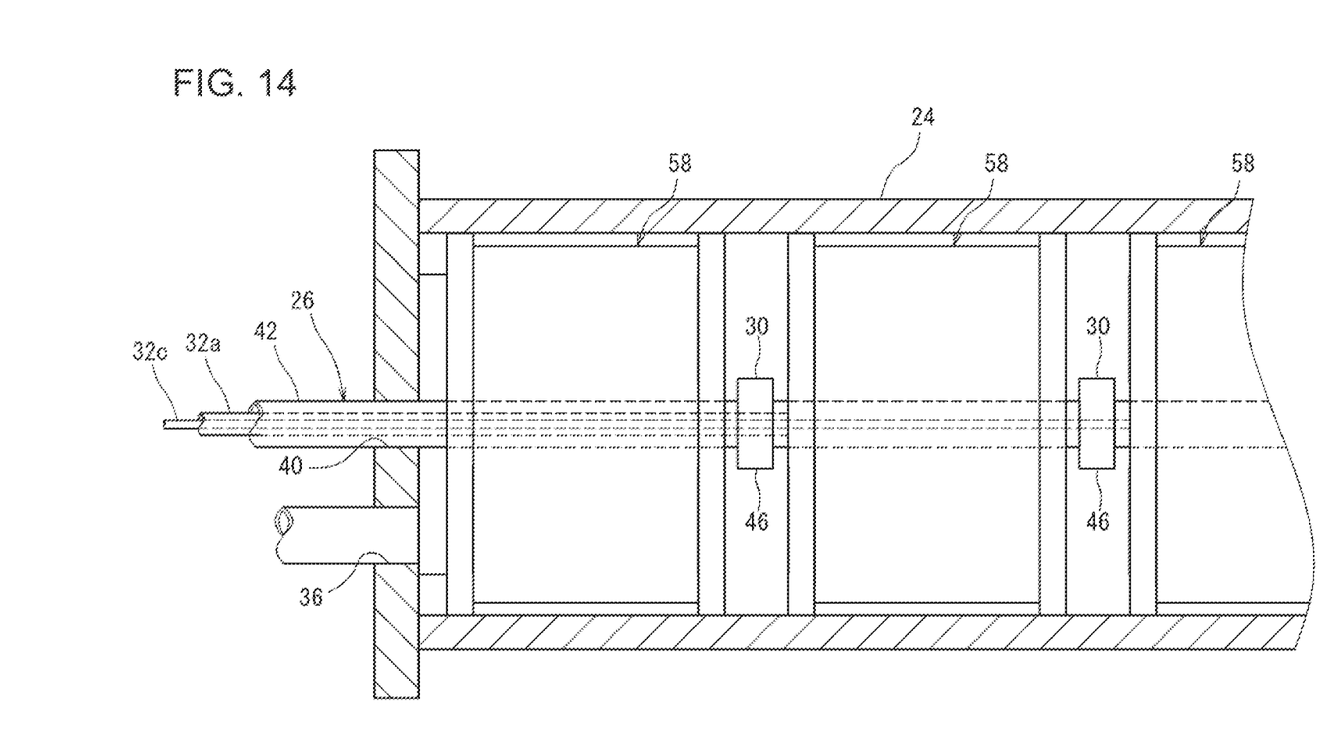
FIG. 14 is a schematic diagram for describing a configuration of a reverse osmosis membrane filtering device according to some embodiments.

FIG. 14 is a diagram for describing the RO membrane filtering device 18 according to some embodiments.

As depicted in FIG. 14, the RO membrane filtering device 18 may include the third insertion tube 32c to be inserted into the first insertion tube 32a as at least one insertion tube 32. In other words, it is sufficient if the RO membrane filtering device 18 includes one or more insertion tubes 32 forming a multi-layer tube in combination with the water collecting pipe 42.

Embodiments of the present invention were described in detail above, but the present invention is not limited thereto, and various amendments and modifications may be implemented.

For instance, while the RO membrane element 58 has a spiral shape and the filter member 48 formed from an RO membrane is wound around the water collecting pipe 42 in a spiral shape in some embodiments described above, an RO membrane element having a flat shape or a pleated shape may be employed.

While each water collecting pipe 42 corresponds to one section in some embodiments described above, a plurality of sections may be provided for one water collecting pipe 42. In other words, the insertion tube 32 may be inserted into a part of one water collecting pipe 42.

Further, the RO membrane filtering device according to some embodiments described above can be applied to other usages besides a seawater desalinating system, such as a purified-water producing system.

DESCRIPTION OF REFERENCE NUMERALS

10 Pretreatment device
12 High-pressure pump
14 Reverse osmosis membrane filtering unit
16 Unprocessed-water header tube
18 Reverse osmosis membrane filtering device
20 Permeate-water header tube
22 Concentrate-water header tube
24 Pressure container
26 Water-collecting member
28 Filter assembly
30 Seal member
32 Insertion tube
34 Pressure adjusting device
36 Inlet of unprocessed water
38 Inlet of processed (concentrate) water
40 Permeate-water outlet
42 Water collecting pipe
44 Water collecting aperture
46 Connector
48 Filter member
50 First spacer
52 Second spacer
54 Axial direction channel 56 Spiral channel
58 Reverse osmosis membrane element
60 Retention member
62 Permeate-water channel
64 Control valve
66 Sensor
68 Controller
70 Guide member

The invention claimed is:

1. A reverse osmosis membrane filtering device, comprising:
- a container having an inlet of unprocessed water, an outlet of concentrate water, and at least one permeate-water outlet;
- a water-collecting member including a plurality of water collecting pipes, and having a plurality of sections each of which extends inside the container and has a plurality of water collecting apertures;
- a plurality of filter assemblies disposed around the plurality of sections, respectively, each of the plurality of filter assemblies including a filter member comprising a reverse osmosis membrane, an axial direction channel extending along the plurality of water collecting pipes, and a water collecting channel extending toward the plurality of water collecting apertures;
- at least one seal member disposed inside the water-collecting member;
- at least one insertion tube inserted inside at least one water collecting pipe of the plurality of water collecting pipes and each defining two permeate-water channels including an outer channel between the at least one water collecting pipe and the at least one insertion tube and an inner channel inside the at least one insertion tube, with the at least one seal member sealing a gap between the at least one water collecting pipe and the at least one insertion tube,
- the two permeate-water channels corresponding to two of the plurality of sections of the water-collecting member; and
- a pressure adjusting device configured to increase a pressure of one of the two permeate-water channels to a pressure higher than that of another one of the two permeate-water channels.

2. The reverse osmosis membrane filtering device according to claim 1,
wherein the pressure adjusting device is configured to increase a pressure of the permeate-water channel corresponding to a more upstream section from among the two permeate-water channels.

3. The reverse osmosis membrane filtering device according to claim 1,
wherein the at least one permeate-water outlet comprises a first permeate-water outlet disposed on one end of the container and a second permeate-water outlet disposed on the opposite end of the container,
wherein the plurality of sections comprises a first section, a second section, a third section, and a fourth section disposed in this order from the first permeate-water outlet toward the second permeate-water outlet,
wherein the at least one insertion tube comprises a first insertion tube extending inside the first section and a second insertion tube extending inside the fourth section,
wherein the first insertion tube defines, as the two permeate-water channels, a first permeate-water channel and a second permeate-water channel corresponding to the first section and the second section, respectively, and
wherein the second insertion tube defines, as the two permeate-water channels, a third permeate-water channel and a fourth permeate-water channel corresponding to the third section and the fourth section, respectively.

4. The reverse osmosis membrane filtering device according to claim 1, further comprising:
- a sensor capable of outputting a measurement signal related to a pressure of at least one of the two permeate-water channels; and
- a controller configured to control the pressure adjusting device on the basis of an output of the sensor.

5. The reverse osmosis membrane filtering device according to claim 1,
wherein the pressure adjusting device includes at least one orifice.

6. The reverse osmosis membrane filtering device according to claim 1, further comprising a guide member disposed inside the water-collecting member and configured to guide insertion and removal of the at least one insertion tube.

7. The reverse osmosis membrane filtering device according to claim 1,
wherein the filter member of the filter assembly is wound around the plurality of water collecting pipes in a spiral shape.

* * * * *